United States Patent
Cui et al.

(10) Patent No.: US 12,494,830 B2
(45) Date of Patent: Dec. 9, 2025

(54) PRE-EMPTION DURING CSI-RS MOBILITY MEASUREMENTS

(71) Applicant: Apple Inc., Cupertino, CA (US)

(72) Inventors: Jie Cui, San Jose, CA (US); Chunxuan Ye, San Diego, CA (US); Dawei Zhang, Saratoga, CA (US); Hong He, San Jose, CA (US); Oghenekome Oteri, San Diego, CA (US); Wei Zeng, Saratoga, CA (US); Weidong Yang, San Diego, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 788 days.

(21) Appl. No.: 17/303,003

(22) Filed: May 18, 2021

(65) Prior Publication Data
US 2021/0367650 A1 Nov. 25, 2021

Related U.S. Application Data

(60) Provisional application No. 63/028,323, filed on May 21, 2020.

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0051* (2013.01); *H04W 8/02* (2013.01); *H04W 24/10* (2013.01)

(58) Field of Classification Search
CPC ...... H04B 7/0626; H04L 5/0051; H04W 8/02; H04W 24/10
(Continued)

(56) References Cited

U.S. PATENT DOCUMENTS

2013/0301450 A1* 11/2013 Geirhofer ............. H04B 7/024
370/252
2015/0085795 A1* 3/2015 Papasakellariou ...... H04L 5/006
370/329
(Continued)

FOREIGN PATENT DOCUMENTS

CN 102215182 10/2011
CN 110249564 A 9/2019
(Continued)

OTHER PUBLICATIONS

NTT Docomo et al., "Higher layer signaling of CSI-RS and muting configurations", 3GPP TSG-RAN WG2 Meeting #72bis, R2-110607, Feb. 21, 2011, 3 sheets.

*Primary Examiner* — Christopher R Crompton
(74) *Attorney, Agent, or Firm* — Fay Kaplun & Marcin, LLP

(57) ABSTRACT

A base station communicates with a first user equipment (UE) and a second UE. The base station determines a first configuration for the first UE for a channel state information reference signal (CSI-RS) on a symbol, schedules a data transmission for the second UE on the symbol where the CSI-RS is configured so that the CSI-RS and the data transmission collide on the symbol and determines a second configuration for the first UE when the CSI-RS and the data transmission collide on the symbol.

18 Claims, 5 Drawing Sheets

(51) Int. Cl.
    *H04W 8/02*      (2009.01)
    *H04W 24/10*    (2009.01)

(58) Field of Classification Search
    USPC .......................................................... 370/329
    See application file for complete search history.

(56) References Cited

U.S. PATENT DOCUMENTS

| | | |
|---|---|---|
| 2018/0278368 A1 | 9/2018 | Kim et al. |
| 2020/0052864 A1 | 2/2020 | Hosseinian et al. |
| 2020/0169364 A1* | 5/2020 | Hao ..................... H04L 5/0053 |

FOREIGN PATENT DOCUMENTS

| | | | | |
|---|---|---|---|---|
| CN | 110291743 | | 9/2019 | |
| WO | WO 2018/128340 | * | 2/2018 | ............ H04W 72/12 |
| WO | 2020/029258 | | 2/2020 | |

\* cited by examiner

PRE-EMPTION DURING CSI-RS MOBILITY MEASUREMENTS

PRIORITY CLAIM/INCORPORATION BY REFERENCE

This application claims priority to U.S. Provisional Application Ser. No. 63/028,323 filed May 21, 2020 and entitled "Pre-emption During CSI-RS Mobility Measurements," the entirety of which is incorporated by reference herein.

BACKGROUND INFORMATION

A channel state information reference symbol (CSI-RS) may be configured by a 5G New Radio (NR) network for a user equipment (UE) to perform mobility measurements. The UE may monitor downlink channels for CSI-RS transmissions from the network in accordance with resource locations identified by the CSI-RS configuration. When the CSI-RS transmission is received, the UE may generate channel quality information (CQI) for a serving cell and/or one or more neighbor cells, for example, for layer-3 (L3) mobility management.

Pre-emption relates to a prioritization of data traffic for particular applications requiring fast and reliable data transmissions, such as public safety applications. For example, in 5G NR, a UE in an enhanced mobile broadband (eMBB) configuration may have eMBB services preempted by ultra-reliable low latency communication (URLLC) services. A pre-emption indication may be transmitted to the UE and the UE may assume that no transmissions to the UE are present in physical resource blocks (PRBs) and OFDM symbols indicated by the pre-emption bits. However, the UE behavior for mobility measurements may be unclear when the OFDM symbols indicated by the pre-emption bits collide with CSI-RS transmissions for the UE.

SUMMARY

Some exemplary embodiments are related to a processor of a base station that is communicating with a first user equipment (UE) and a second UE and is configured to perform operations. The operations include determining a first configuration for the first UE for a channel state information reference signal (CSI-RS) on a symbol, scheduling a data transmission for the second UE on the symbol where the CSI-RS is configured so that the CSI-RS and the data transmission collide on the symbol and determining a second configuration for the first UE when the CSI-RS and the data transmission collide on the symbol.

Other exemplary embodiments are related to a processor of a first base station that is communicating with a first user equipment (UE) and a second UE and is configured to perform operations. The operations include exchanging timing information with a second base station, determining if a channel state information reference signal (CSI-RS) configured for the first UE for measuring CSI on the second base station collides with a data transmission for the second UE on a same symbol x and configuring a zero-power CSI-RS (ZP-CSI-RS) as the CSI-RS for the first UE CSI measurement on the second base station.

Still further exemplary embodiments are related to a processor of a first base station that is communicating with a first user equipment (UE) and a second UE and is configured to perform operations. The operations include configuring the second UE for a data transmission on symbol x and transmitting a pre-emption indication to the first UE on symbol x, wherein the pre-emption indication configures the first UE to not decode a physical downlink shared channel (PDSCH) on the symbol x and, when a channel state information reference signal (CSI-RS) is configured for the first UE for measuring CSI from a second base station on symbol x, the first UE performs the CSI measurement on the symbol x.

Additional exemplary embodiments are related to a processor of a base station that is communicating with a first user equipment (UE) and a second UE and is configured to perform operations. The operations include determining a first configuration for the first UE for a special physical downlink shared channel (PDSCH) on a symbol, scheduling a data transmission for the second UE on the symbol where the special PDSCH is configured so that the special PDSCH and the data transmission collide and transmitting a pre-emption indication to the first UE for the symbol, wherein the first UE ignores the pre-emption indication and decodes the special PDSCH.

Further exemplary embodiments are related to a processor of a base station that is communicating with a first user equipment (UE) in an ultra reliable low latency communications (URLLC) configuration and a second UE and is configured to perform operations. The operations include determining a configuration for the first UE for a special physical downlink shared channel (PDSCH) on a symbol and scheduling a data transmission for the second UE on the symbol where the special PDSCH is configured so that the special PDSCH and the data transmission collide, wherein the second UE ignores the data transmission and decodes the PDSCH.

Still other exemplary embodiments are related to a processor of a base station that is communicating with a user equipment (UE) in an ultra reliable low latency communications (URLLC) configuration and is configured to perform operations. The operations include determining a configuration for the UE for mobility downlink (DL) measurements of the base station or one or more neighbor base stations on a symbol and scheduling a data transmission for the UE on the symbol where the special PDSCH is configured so that the special PDSCH and the data transmission collide, wherein the UE prioritizes decoding the data transmission over the mobility DL measurements.

DETAILED DESCRIPTION

Figure 1:
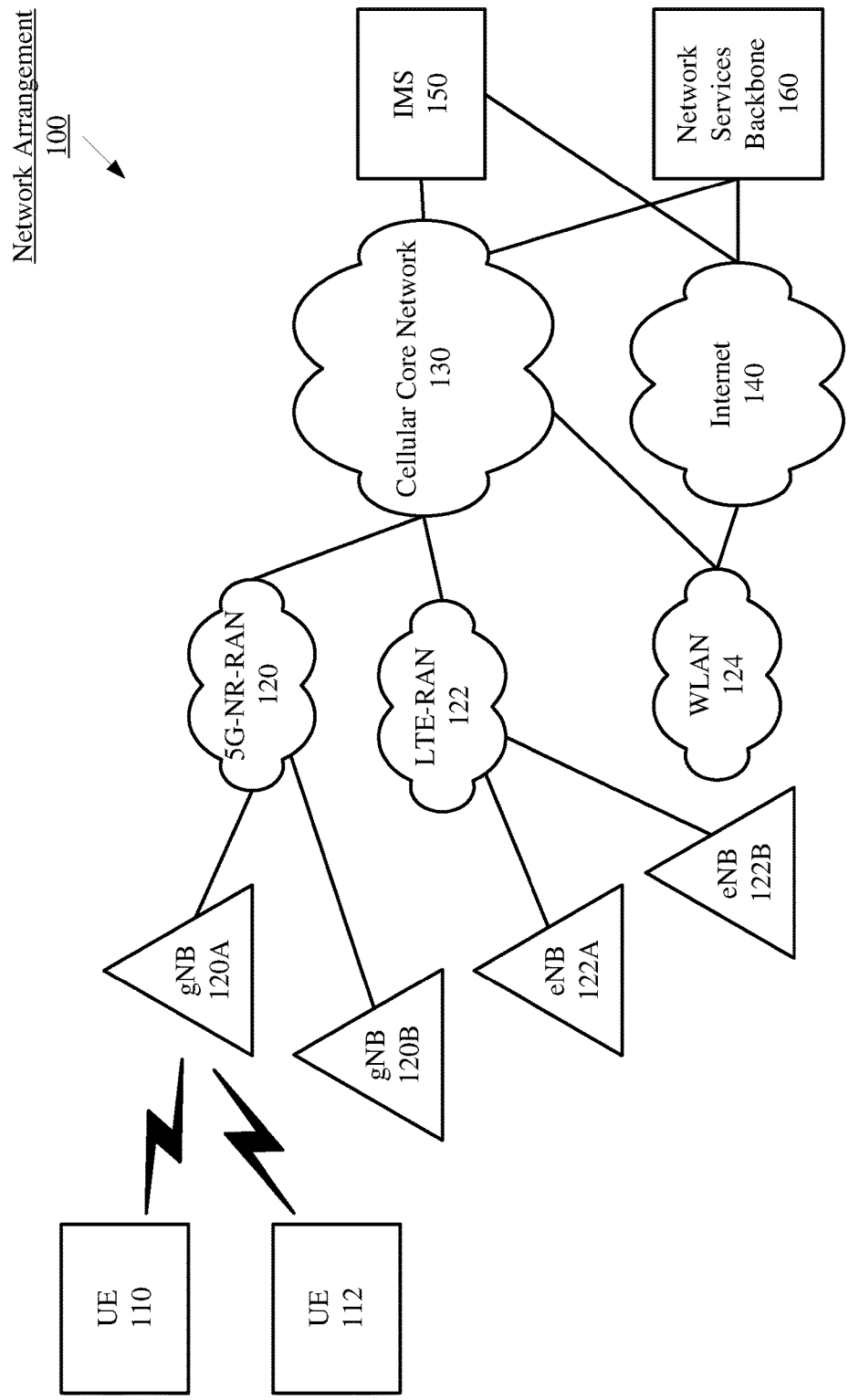
FIG. 1 shows a network arrangement according to various exemplary embodiments.

The exemplary embodiments may be further understood with reference to the following description and the related appended drawings, wherein like elements are provided with the same reference numerals. The exemplary embodiments describe network configurations for a user equipment (UE) to manage scenarios where mobility measurement reference signals, e.g., channel state information reference signals (CSI-RS), may conflict/collide with high priority data, e.g. URLLC data transmissions.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 122. The connections may be either one of an enhanced mobile broadband (eMBB) connection or an ultra-reliable low latency communications (URLLC) connection.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary embodiments may apply to any appropriate number of gNBs. The UEs 110, 112 may also connect to the LTE-RAN 122 via either or both of the eNBs 122A, 122B, or to any other type of RAN, as mentioned above.

In the network arrangement 100, the UEs 110, 112 are shown as having connections to the gNB 120A. In some embodiments, the UE 110 may be connected to the gNB 120A via an eMBB connection while the UE 112 may be connected to the gNB 120A via a URLLC connection. The gNB 120A may transmit a pre-emption indication to the eMBB UE, e.g., UE 110, so that a URLLC data transmission may be sent to the URLLC UE e.g., UE 112, on the pre-emption symbols with little to no interference being caused by transmissions over the eMBB connection. The pre-emption indication may be a Downlink Control Information (DCI) signal, e.g., DCI Format 2_1. The gNB 120B may be a neighbor cell to the gNB 120A and be used for channel state information (CSI) measurements, as described in further detail below.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
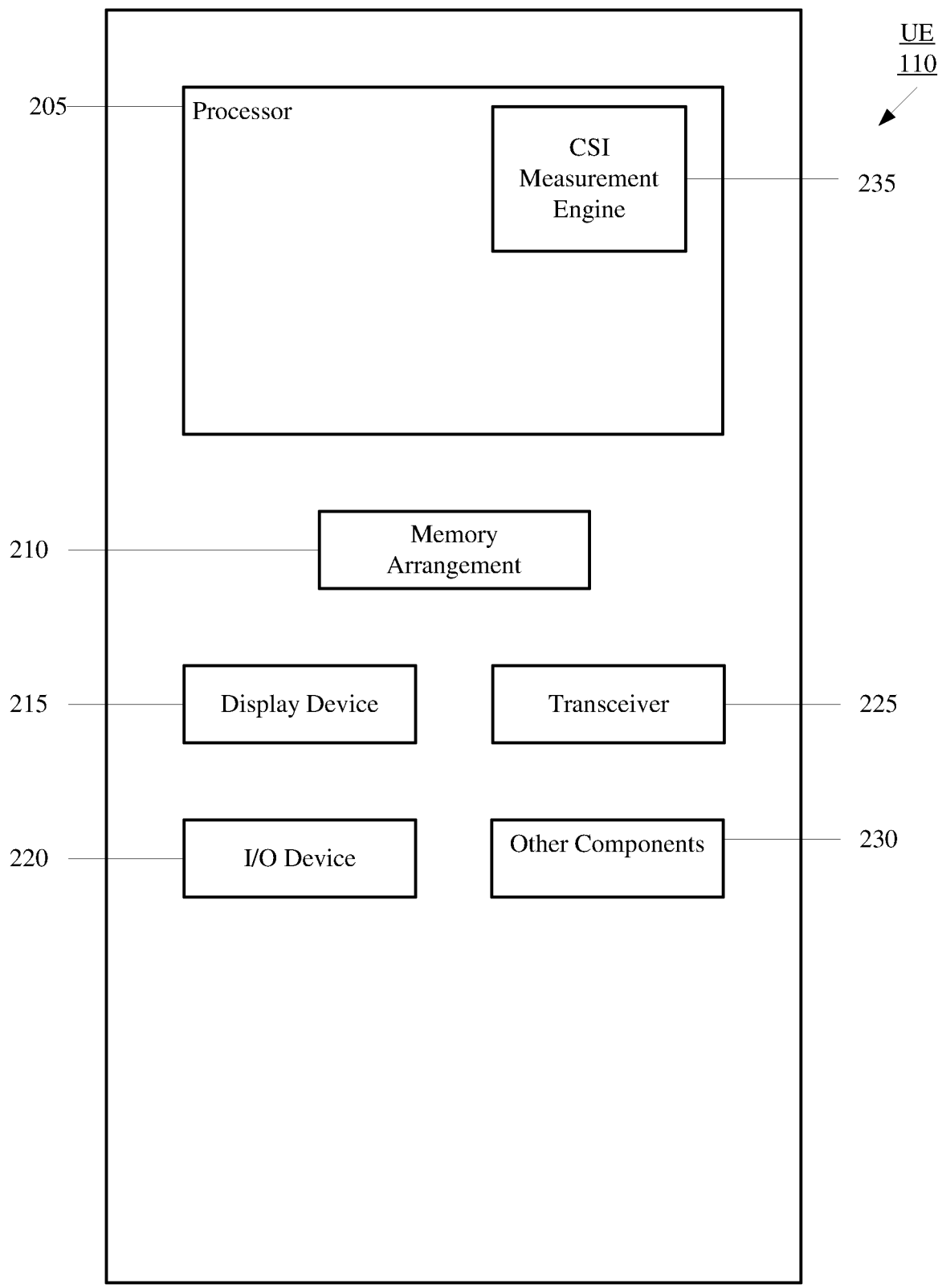
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a CSI engine 235. The CSI engine 235 may perform operations including performing channel measurements, e.g., for a CSI-RS based on a network configuration that accounts for potential collisions with URLLC data transmissions.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
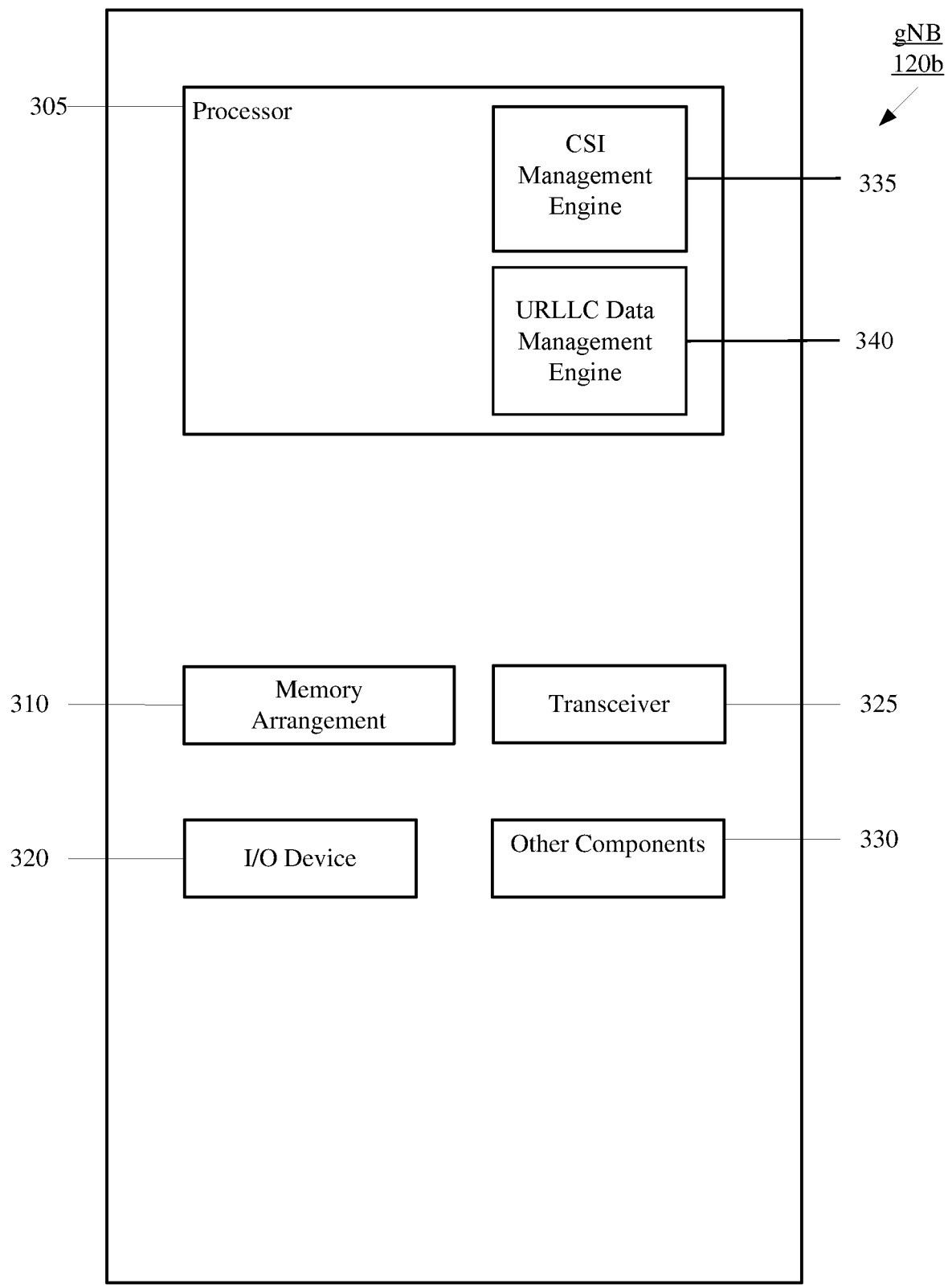
FIG. 3 shows an exemplary network base station according to various exemplary embodiments.

FIG. 3 shows an exemplary network base station, in this case gNB 120A, according to various exemplary embodiments. As noted above with regard to the UE 110, the gNB 120A may represent a base station providing services to the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a CSI management engine 335 and a URLLC data management engine 340. The CSI management engine 335 may perform operations including configuring a UE to perform channel measurements in view of potential collisions with URLLC data transmissions. The URLLC data management engine 340 may perform operations including configuring a UE for URLLC data transmissions.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies).

Preemption relates to a prioritization of data traffic for particular applications requiring fast and reliable data transmissions, such as public safety applications. In 5G NR, a UE in an enhanced mobile broadband (eMBB) configuration may have eMBB services preempted by ultra-reliable low latency communication (URLLC) services.

In the Third Generation Partnership (3GPP) Technical Specification TS 38.212, the DCI Format 2_1 is defined for 5G NR. The DCI Format 2_1 may be used for notifying a UE of physical resource block(s) (PRBs) and OFDM symbol (s) where the UE may assume no transmission is intended for the UE. The following information may be transmitted by means of the DCI format 2_1 with a cyclic redundancy check (CRC) scrambled by an INT-RNTI: Pre-emption indication 1, Pre-emption indication 2, . . . , Pre-emption indication N. The size of DCI format 2_1 is configurable by higher layers up to 126 bits (according to Clause 11.2 of [5, TS 38.213]). Each pre-emption indication is 14 bits.

The UE behavior when it receives a DCI Format 2_1 may be as follows. If a UE detects a DCI format 2_1 for a serving cell from the configured set of serving cells, the UE may assume that no transmissions to the UE are present in PRBs and in symbols that are indicated by the DCI format 2_1, from a set of PRBs and a set of symbols of the last monitoring period. The indication by the DCI format 2_1 is not applicable to receptions of SS/PBCH blocks. In the example started above, when the eMBB UE (e.g., UE 110) receives the DCI format 2_1, the UE 110 will understand that there is no transmission to the UE 110 in the indicated symbols. Thus, the UE 110 may not monitor these symbols because there will be no transmissions for the UE 110.

A CSI-RS may be configured for the UE for performing mobility measurements. The UE may monitor downlink channels for CSI-RS transmissions from the network in accordance with resource locations identified by the CSI-RS configuration. When the CSI-RS transmission is received, the UE may generate channel quality information (CQI) for a serving cell and/or one or more neighbor cells, for example for layer-3 (L3) mobility management. However, there is a potential for CSI-RS transmissions to collide with the OFDM symbols indicated by the pre-emption bits. If the UE 110 is not monitoring these symbols, the UE 110 will not receive and measure the CSI-RS for mobility and/or any other purpose.

According to some exemplary embodiments, the network configures URLLC data transmissions and/or L3 CSI-RSs for serving cell measurements for an eMBB UE so that collisions between the OFDM symbols in a pre-emption indication and the CSI-RS may be avoided and/or managed.

According to other exemplary embodiments, the network may schedule URLLC data for a URLLC UE on the symbols where an L3 CSI-RS measurement is configured for an eMBB UE. The following provides several exemplary manners of handling this scenario.

In some exemplary embodiments, the network avoids indicating pre-emption to the eMBB UE for those symbols with L3 CSI-RSs configured. In other words, although the URLLC data and the L3 CSI-RS may collide, the eMBB UE will not receive a pre-emption indication for those symbols and still performs channel measurements despite the channel being additionally used for the URLLC data.

In other exemplary embodiments, the network configures a zero-power CSI-RS (ZP-CSI-RS) to be the L3 CSI-RS measurement for the eMBB UE, regardless of a pre-emption configuration. A ZP-CSI-RS masks or mutes certain resource elements (REs) to make those REs unavailable for Physical Downlink Scheduling Channel (PDSCH) transmission to allow for an interference measurement. A ZP-CSI-RS does not mean that there is no transmission in the resource element. Rather, the resource element includes a non-zero power CSI-RS (NZP-CSI-RS) for the other UE, e.g., UE 112 in the current example. In this exemplary embodiment, since the ZP-CSI-RS is configured for the L3 CSI-RS measurement, the URLLC UE and the eMBB UE will skip those CSI-RS symbols for data reception and only use the symbols for interference and mobility measurements.

In still further exemplary embodiments, the network may apply a scheduling restriction for all connected UEs, including the URLLC UE and the eMBB UE, on CSI-RS symbols for L3 measurement. For example, the network may not schedule CSI-RS symbols for L3 measurements for certain symbols. As opposed to the above exemplary embodiments where the network will not schedule URLLC data transmissions and/or L3 CSI-RSs to conflict, in these exemplary embodiments, there may be instances when there is a conflict, but there may be certain symbols where scheduling restrictions will eliminate the conflicts by not scheduling the CSI-RS symbols for L3 measurements in certain symbols. In these exemplary embodiments, the URLLC and eMBB UEs will expect a scheduling restriction on CSI-RS symbols for L3 measurements.

Figure 4:
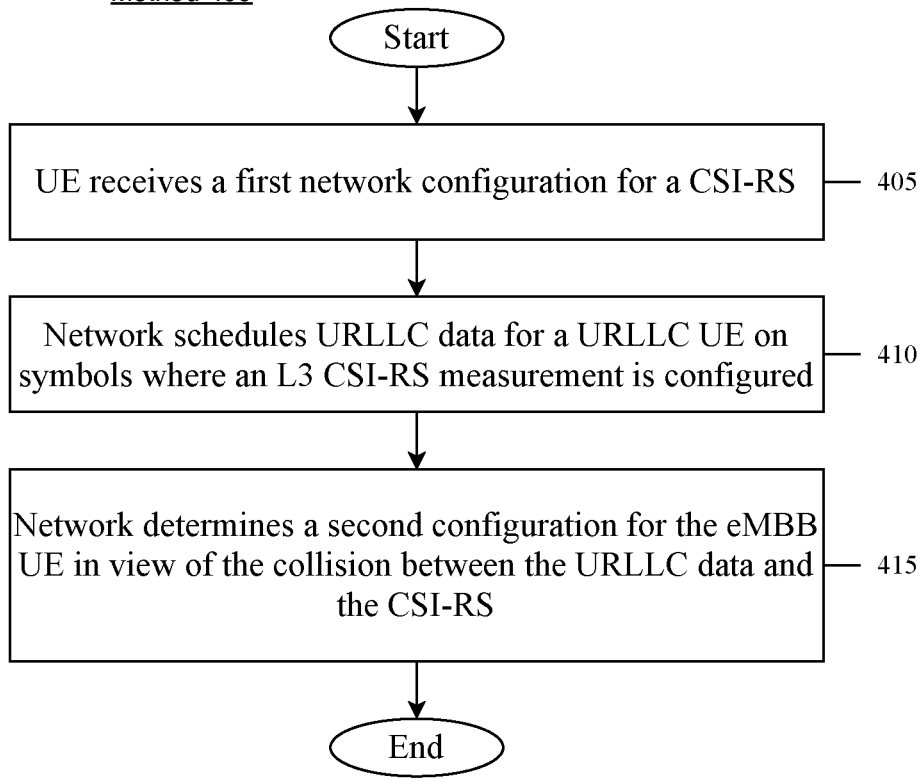
FIG. 4 shows a method for a UE in an enhanced mobile broadband (eMBB) configuration to perform mobility measurements according to various exemplary embodiments.

FIG. 4 shows a method 400 for a UE in an enhanced mobile broadband (eMBB) configuration to perform mobility measurements. In 405, the UE receives a first network configuration for a CSI-RS. In 410, the network schedules URLLC data for a URLLC UE on the symbols where an L3 CSI-RS measurement is configured. As discussed above, in this example, the URLLC data and the CSI-RS may collide.

In 415, the network determines a second configuration for the eMBB UE in view of the collision between the URLLC data and the CSI-RS. As discussed above, in some exemplary embodiments, the network will not indicate any pre-emption for those symbols to the eMBB UE. Thus, the second configuration will remain the same as the first configuration for the eMBB UE. In other exemplary embodiments, the second configuration comprises a ZP-CSI-RS for the L3 CSI-RS regardless of whether the UE receives a pre-emption indication. In still further exemplary embodiments, the network applies the scheduling restriction discussed above.

The above exemplary embodiments addressed issues related to pre-emption with respect to CSI-RS measurements for a serving cell. The following exemplary embodiments address issues related to CSI-RS measurements for neighbor cells. According to the following exemplary embodiments, the network configures URLLC data transmissions and/or L3 CSI-RSs for neighbor cell measurements for an eMBB UE so that collisions between the OFDM symbols in a pre-emption indication and the CSI-RS may be avoided and/or managed.

Figure 5:
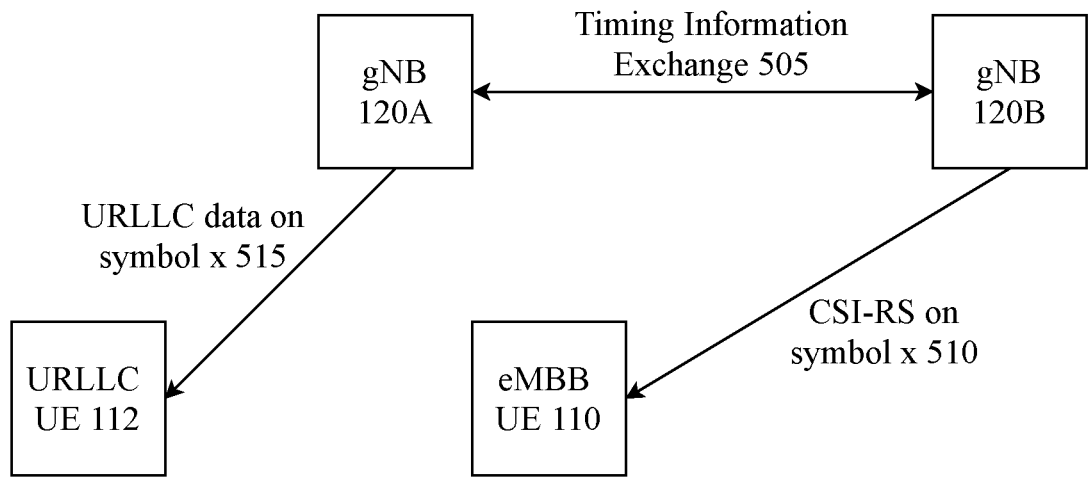
FIG. 5 shows a first network configuration for performing L3 CSI-RS neighbor cell measurements according to various exemplary embodiments.

FIG. 5 shows a first network configuration 500 for performing L3 CSI-RS neighbor cell measurements according to various exemplary embodiments. In this exemplary embodiment, a first (serving) cell gNB 120A is in a scenario with an eMBB connection established with a first UE 110 and a URLLC connection established with a second UE 112. The gNB 120B is a neighbor cell.

In signal 505, the serving cell gNB 120A, exchanges timing information with the neighbor cell gNB 120B. In view of the timing information, the gNB 120A determines if the CSI-RS L3 measurement for the eMBB UE 110 on the neighbor cell (signal 510) collides with a URLLC data symbol for the URLLC UE 112 on the first cell gNB 120A (signal 515).

If the URLLC data channel of the serving cell gNB 120A collides with the CSI-RS on symbol x of the neighbor cell gNB 120B, the serving cell gNB 120A configures a ZP-CSI-RS for the eMBB UE 110 on symbols x−1, x and x+1 to perform the CSI-RS L3 neighbor cell measurements. The serving cell gNB 120A will avoid scheduling any PDSCH on those ZP-CSI-RS symbols x−1, x and x+1. While the serving cell gNB 120A and the neighbor cell gNB 120B may exchange timing information, there still may be a cell phase synchronization misalignment between the cells. This is why the serving cell gNB 120A will configure the symbols x−1, x and x+1 with the ZP-CSI-RS rather than just the symbol x. However, it should be understood that other combinations of symbols may be configured as ZP-CSI-RS depending on the accuracy of the timing information and alignment.

The eMBB UE 110 will not decode any PDSCH on the ZP-CSI-RS symbols x−1, x and x+1 indicated by the serving cell gNB 120A, and instead will perform the CSI-RS L3 measurement for the neighbor cell gNB 120B on those symbols.

Figure 6:
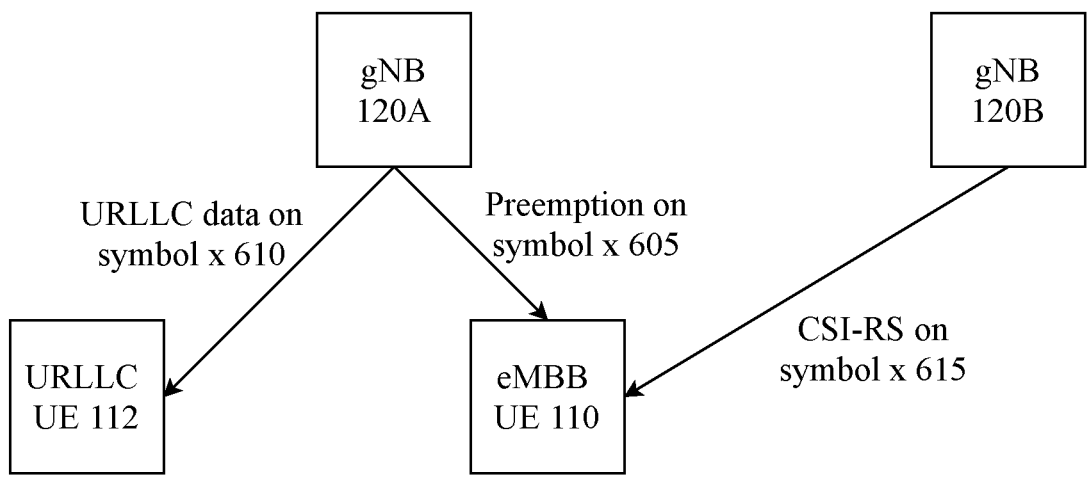
FIG. 6 shows a second network configuration for performing L3 CSI-RS neighbor cell measurements according to various exemplary embodiments.

FIG. 6 shows a second network configuration 600 for performing L3 CSI-RS neighbor cell measurements according to various exemplary embodiments. In this exemplary embodiment, a first (serving) cell gNB 120A is in a scenario with an eMBB connection established with a first UE 110 and a URLLC connection established with a second UE 112. The gNB 120B is a neighbor cell.

In this exemplary embodiment, the serving cell gNB 120A indicates to the eMBB UE 110, a pre-emption indication on symbol x (signal 605). The pre-emption indication corresponds to the OFDM symbols scheduled to carry URLLC data on symbol x (signal 610) to the URLLC 112. The UE 110 will not decode any PDSCH on symbol x based on the pre-emption indication. If the CSI-RS for neighbor cell measurements happens to be transmitted on symbol x (signal 615), the eMBB UE 110 will measure the CSI-RS from the second cell gNB 120B.

In other exemplary embodiments, the network may schedule URLLC data transmissions and/or special PDSCH that collide. For example, a special PDSCH may comprise a Remaining Minimum System Information (RMSI) with a system information update for the eMBB UE. In this scenario, the exemplary embodiments may be implemented so that collisions between the OFDM symbols in a pre-emption indication and the special PDSCH may be avoided and/or managed.

According to some exemplary embodiments, the network avoids configuring pre-emption on the symbols carrying a special PDSCH, e.g., an RMSI PDSCH, or another PDSCH carrying system information. The network will avoid scheduling URLLC data that will collide with those special PDSCH on the same frequency/time domain resource.

In other exemplary embodiments, the network may schedule URLLC data for a URLLC UE on the symbols carrying a special PDSCH. In these scenarios when the network configures pre-emption that collides with the special PDSCH, the UE ignores the pre-emption indication to decode the special PDSCH. For example, an eMBB UE will ignore pre-emption to keep decoding the special PDSCH. In another example, a URLLC UE will ignore the URLLC data but decode the special PDSCH.

According to still further exemplary embodiments, the network may configure URLLC data transmissions and/or URLLC DL measurements for a URLLC UE that collide. The exemplary embodiments may be implemented so that collisions between the data channel and the DL measurement may be avoided and/or managed.

In some exemplary embodiments, a measurement restriction may be applied on URLLC data symbols for the URLLC UE. The URLLC UE may prioritize decoding the URLLC data channel rather than the mobility DL measurement of neighbor cells and/or the serving cell. For example, the URLLC UE may prioritize decoding the URLLC data channel rather than the Radio Link Monitoring (RLM), Beam Failure Detection (BFD), Candidate Beam Detection (CBD) and Layer 1 Reference Signal Received Power (L1 RSRP) measurements of the serving cell.

In other exemplary embodiments, timing information may be exchanged between serving and neighbor cells. Based on this timing information, the network may avoid configuring the URLLC UE to perform measurements on those URLLC data symbols that collide with the URLLC data transmissions.

In still further exemplary embodiments, timing information may again be exchanged between serving and neighbor cells. Based on this timing information, the network may avoid scheduling the URLLC data channel that collide with the URLLC DL measurements.

EXAMPLES

A first example includes a processor of a first base station that is communicating with a first user equipment (UE) and a second UE and is configured to perform operations comprising exchanging timing information with a second base station, determining if a channel state information reference signal (CSI-RS) configured for the first UE for measuring CSI on the second base station collides with a data transmission for the second UE on a same symbol x and configuring a zero-power CSI-RS (ZP-CSI-RS) as the CSI-RS for the first UE CSI measurement on the second base station.

A second example includes the processor of the first example, wherein the first UE is in an enhanced mobile broadband (eMBB) configuration with the first base station and the second UE is in an ultra reliable low latency communications (URLLC) configuration with the first base station.

A third example includes the processor of the second example, wherein the ZP-CSI-RS is configured on the symbol x, symbol x−1, and symbol x+1.

A fourth example includes the processor of the third example, wherein the operations further comprise configuring the first UE to not decode any physical downlink shared channel (PDSCH) on the symbols x−1, x and x+1.

A fifth example includes a processor of a first base station that is communicating with a first user equipment (UE) and a second UE and is configured to perform operations comprising configuring the second UE for a data transmission on symbol x and transmitting a pre-emption indication to the first UE on symbol x, wherein the pre-emption indication configures the first UE to not decode a physical downlink shared channel (PDSCH) on the symbol x and, when a channel state information reference signal (CSI-RS) is configured for the first UE for measuring CSI from a second base station on symbol x, the first UE performs the CSI measurement on the symbol x.

A sixth example includes the processor of the fifth example, wherein the first UE is in an enhanced mobile broadband (eMBB) configuration with the first base station and the second UE is in an ultra reliable low latency communications (URLLC) configuration with the first base station.

A seventh example includes a processor of a base station that is communicating with a first user equipment (UE) and a second UE and is configured to perform operations comprising determining a first configuration for the first UE for a special physical downlink shared channel (PDSCH) on a symbol, scheduling a data transmission for the second UE on the symbol where the special PDSCH is configured so that the special PDSCH and the data transmission collide and transmitting a pre-emption indication to the first UE for the symbol, wherein the first UE ignores the pre-emption indication and decodes the special PDSCH.

An eighth example includes the processor of the seventh example, wherein the first UE is in an enhanced mobile broadband (eMBB) configuration with the base station and the second UE is in an ultra reliable low latency communications (URLLC) configuration with the base station.

A ninth example includes the processor of the seventh example, wherein the special PDSCH is a remaining minimum system information (RMSI).

A tenth example includes a base station that is communicating with a first user equipment (UE) in an ultra reliable low latency communications (URLLC) configuration and a second UE and is configured to perform operations comprising determining a configuration for the first UE for a special physical downlink shared channel (PDSCH) on a symbol and scheduling a data transmission for the second UE on the symbol where the special PDSCH is configured so that the special PDSCH and the data transmission collide, wherein the second UE ignores the data transmission and decodes the PDSCH.

An eleventh example includes a base station that is communicating with a user equipment (UE) in an ultra reliable low latency communications (URLLC) configuration and is configured to perform operations comprising determining a configuration for the UE for mobility downlink (DL) measurements of the base station or one or more neighbor base stations on a symbol and scheduling a data transmission for the UE on the symbol where the special PDSCH is configured so that the special PDSCH and the data transmission collide, wherein the UE prioritizes decoding the data transmission over the mobility DL measurements.

A twelfth example includes the processor of the eleventh example, wherein the mobility DL measurements comprise one of a Radio Link Monitoring (RLM), Beam Failure Detection (BFD), Candidate Beam Detection (CBD) and Layer 1 Reference Signal Received Power (L1 RSRP) measurements of the serving cell.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a base station that is communicating with a first user equipment (UE) and a second UE and is configured to perform operations comprising:
   determining a first configuration for the first UE for a channel state information reference signal (CSI-RS) on a symbol;
   scheduling a data transmission for the second UE on the symbol where the CSI-RS is configured so that the CSI-RS and the data transmission collide on the symbol; and
   determining a second configuration for the first UE when the CSI-RS and the data transmission collide on the symbol.

2. The processor of claim 1, wherein the first UE is in an enhanced mobile broadband (eMBB) configuration with the base station and the second UE is in an ultra reliable low latency communications (URLLC) configuration with the base station.

3. The processor of claim 2, wherein the CSI-RS is used by the first UE to perform layer 3 (L3) CSI-RS mobility measurements.

4. The processor of claim 3, wherein the base station does not indicate pre-emption to the first UE and the second configuration is the first configuration.

5. The processor of claim 3, wherein the second configuration includes a zero-power CSI-RS (ZP-CSI-RS) as the L3 CSI-RS.

6. The processor of claim 3, wherein the operations further comprise:
   applying a scheduling restriction to the first UE on the symbol.

7. The processor of claim 6, wherein the scheduling restriction comprises not scheduling control or data transmissions to the first UE on the symbol.

8. The processor of claim 7, wherein the not scheduling the data transmissions comprises not scheduling Physical Downlink Shared Channel (PDSCH) transmissions.

9. The processor of claim 6, wherein the operations further comprise:
   applying the scheduling restriction to the second UE on the symbol.

10. A base station, comprising:
    a transceiver configured to communicate with a first user equipment (UE) and a second UE; and
    a processor communicatively coupled to the transceiver and configured to perform operations comprising:
    determining a first configuration for the first UE for a channel state information reference signal (CSI-RS) on a symbol;
    scheduling a data transmission for the second UE on the symbol where the CSI-RS is configured so that the CSI-RS and the data transmission collide on the symbol; and
    determining a second configuration for the first UE when the CSI-RS and the data transmission collide on the symbol.

11. The base station of claim 10, wherein the first UE is in an enhanced mobile broadband (eMBB) configuration with the base station and the second UE is in an ultra reliable low latency communications (URLLC) configuration with the base station.

12. The base station of claim 11, wherein the CSI-RS is used by the first UE to perform layer 3 (L3) CSI-RS mobility measurements.

13. The base station of claim 12, wherein the base station does not indicate pre-emption to the first UE and the second configuration is the first configuration.

14. The base station of claim 12, wherein the second configuration includes a zero-power CSI-RS (ZP-CSI-RS) as the L3 CSI-RS.

15. The base station of claim 12, wherein the operations further comprise:
    applying a scheduling restriction to the first UE on the symbol.

16. The base station of claim 15, wherein the scheduling restriction comprises not scheduling control or data transmissions to the first UE on the symbol.

17. The base station of claim 16, wherein the not scheduling the data transmissions comprises not scheduling Physical Downlink Control Channel (PDSCH) transmissions.

18. The base station of claim 15, wherein the operations further comprise:
    applying the scheduling restriction to the second UE on the symbol.

* * * * *